(12) United States Patent
West (10) Patent No.: US 6,814,022 B1
(45) Date of Patent: Nov. 9, 2004

(54) VEHICLE ALERT SYSTEM

(76) Inventor: Wayne West, 401 Sulphur Springs Rd., Pauline, SC (US) 29374

( * ) Notice: Subject to any disclaimer, the term of this patent is extended or adjusted under 35 U.S.C. 154(b) by 3 days.

(21) Appl. No.: 10/280,882

(22) Filed: Oct. 25, 2002

Related U.S. Application Data (60) Provisional application No. 60/339,450, filed on Oct. 26, 2001.

(51) Int. Cl.[7] ............................................. G09F 21/04
(52) U.S. Cl. ........................ 116/28 R; 40/591; 40/492
(58) Field of Search ........................ 116/28 R; 40/591, 40/593, 484, 492, 493; 10/109; G09F 21/04

(56) References Cited

U.S. PATENT DOCUMENTS

| | | | | |
|---|---|---|---|---|
| 1,590,967 | A | * | 6/1926 | Fenton .......................... 40/492 |
| 2,706,352 | A | * | 4/1955 | Clark ........................... 40/492 |
| 2,933,841 | A | * | 4/1960 | Lawlor .......................... 40/591 |
| 3,139,611 | A | * | 6/1964 | Fleming ........................ 340/321 |
| 3,242,481 | A | * | 3/1966 | Lasting .................. 340/815.73 |
| 3,497,980 | A | | 3/1970 | Brown et al. ................... 40/591 |
| 3,703,152 | A | * | 11/1972 | Morton ...................... 116/28 R |
| 3,903,629 | A | * | 9/1975 | Gruna .......................... 40/591 |
| 3,975,849 | A | | 8/1976 | Tuleja ........................... 40/583 |
| 4,070,775 | A | | 1/1978 | Brooks ......................... 40/492 |
| 4,091,553 | A | | 5/1978 | Glennie | |
| 4,163,426 | A | | 8/1979 | O'Neill | |
| 4,178,874 | A | * | 12/1979 | Berns et al. ............... 116/28 R |
| 4,325,318 | A | * | 4/1982 | Kitrell ....................... 116/28 R |
| 4,348,978 | A | | 9/1982 | Brucato | |
| 5,048,451 | A | | 9/1991 | Reimers et al. ........... 116/35 A |
| 5,156,274 | A | * | 10/1992 | Williams et al. ............ 206/573 |
| D331,944 | S | | 12/1992 | Ortiz | |
| 5,195,264 | A | * | 3/1993 | Johanson et al. ............. 40/591 |
| 5,681,106 | A | * | 10/1997 | Coultas et al. .............. 362/190 |

FOREIGN PATENT DOCUMENTS

GB             2203584 A    * 10/1988          G90F/21/04

* cited by examiner

*Primary Examiner*—Christopher W. Fulton
*Assistant Examiner*—R. Alexander Smith
(74) *Attorney, Agent, or Firm*—Leatherwood Walker Todd & Mann, P.C.; Thomas W. Epting (57) ABSTRACT

A signal device for attachment to a vehicle having a housing with a plurality of signal members carried therein. The signal members are pivotally connected within an interior compartment of the housing and may be individually pivoted out of the compartment through an opening provided in the housing. An attachment device is connected to the housing and provides that the housing may be attached to a vehicle window in such a manner that the housing projects generally perpendicularly outwardly with the respect to the vehicle window, with one or more preselected signal members being exposed and hanging downwardly from the housing for alerting passersby.

19 Claims, 7 Drawing Sheets

VEHICLE ALERT SYSTEM

This application claims benefit of U.S. Provisional application Ser. No. 60/339,450, filed Oct. 26, 2001, the entirety of the disclosure of which is incorporated herein by reference thereto.

BACKGROUND OF THE INVENTION

This invention relates generally to a system for alerting passersby of vehicle occupants in need of assistance.

Generally, trucks and automobiles manufactured today seldom breakdown. However, mechanical failures do sometimes occur with vehicles, and with tires of the vehicle, or, a motorist could inadvertently run out of fuel, which may cause a motorist to be stranded. Also, there may be situations where a medical emergency arises with an occupant of a vehicle. In any of these situations, assistance is needed.

With the increased use of mobile phones, there are many situations where a phone call can be made to obtain assistance. However, this first requires that mobile phone service be available in that area, and also, that the motorist has available a suitable phone number for obtaining help locally. Further, the motorist may be uncertain as to his or her exact whereabouts, which can frustrate attempts at assistance or rescue.

Accordingly, it would be desirable at times for a sign or other signal device to be used to alert passersby of the need of assistance by the occupants of the vehicle. Preferably, such sign or signal would give some detail as to the type of actual assistance required, such as whether there is a medical emergency aboard the vehicle, or if mechanical, fuel or tire repair services are needed.

Devices have been patented for alerting oncoming drivers of vehicles in distress. For example, U.S. Pat. No. 3,497,890, issued to Brown, et al., discloses a portable road sign having pivotal sign elements with messages provided thereon. U.S. Pat. No. 4,070,775, issued to Brooks, and U.S. Pat. No. Des. 331,944, issued to Ortiz, disclose multi-message road emergency signs for distress vehicles. The Brooks device is placed on the roof or other horizontal surface of the vehicle and includes pivoted panels having messages thereon. Similarly, the Ortiz device is apparently attached to a surface of the vehicle.

U.S. Pat. No. 3,975,849, issued to Tuleja; U.S. Pat. No. 4,348,978, issued to Brucato; U.S. Pat. No. 4,163,426, issued to O'Neill; U.S. Pat. No. 4,091,553, issued to Glennie; and U.S. Pat. No. 5,048,451, issued to Reimers, et al., each disclose sign devices for attachment to the window of the vehicle. In particular, the Glennie patent discloses the use of various icons for representing different needs of the stranded motorist. The Reimers, et al. device is configured to swing into a horizontal position once a predetermined speed has been reached.

A desirable fixture of a motorist alert device would be the ability to set up the device while remaining in the car, because of the dangers faced by exiting the vehicle and standing on the roadside.

While the foregoing designs are known, there still exists a need for vehicle alert system which is compact, easy to use, and which provides readily visible messages regarding the needs of the vehicle's occupants.

SUMMARY OF THE INVENTION

It is, therefore, the principal object of the present invention to provide a vehicle alert system.

Another object of the present invention is to provide a vehicle alert system which is compact, and self-contained.

Yet another object of the present invention is to provide a vehicle alert system which is quick and easy to set up and put into use.

Yet another object of the present invention is to provide a vehicle alert system which is useful with a wide variety of vehicles.

Still another object of the present invention is to provide a vehicle alert system which includes a variety of readily visible messages regarding the needs of the vehicles' occupants.

Yet another object of the present invention is to provide a vehicle alert system and method for its use which make quickly be put into use without requiring the motorist to exit the vehicle.

Generally, the present invention includes a housing having a plurality of signal members carried therein. The signal members are pivotally connected within an interior compartment of the housing and may be individually pivoted out of the compartment through an opening provided in the housing. An attachment device is connected to the housing which allows the housing to be attached to a vehicle window in such a manner that the housing projects generally perpendicularly outwardly with the respect to the vehicle window, with one or more preselected signal members being exposed and hanging downwardly from the housing.

In a preferred embodiment, the sign members are generally circular in shape and are carried within a housing of a generally square shape.

In another embodiment, the attachment device is a hook pivotally attached to the housing for moving between a retracted position with respect to the housing, and an extended position for attaching the housing to the vehicle window or other support surface.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

The accompanying drawings and the description which follows set forth this invention in its preferred embodiment. However, it is contemplated that persons generally familiar with automobiles and signage will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the vehicle alert system of the present invention is indicated generally in the figures by reference character 10.

Figure 1:
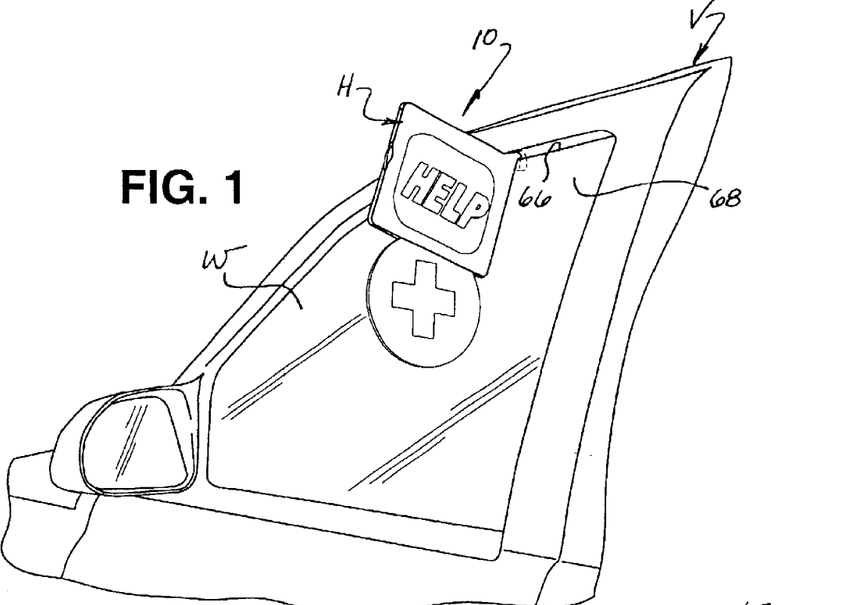
FIG. 1 is a perspective view of a vehicle alert system constructed in accordance with the present invention and in place attached to a vehicle window.

Turning to FIG. 1, the vehicle alert system 10 of the present invention is illustrated attached to a window, generally W, of a vehicle, generally V. It is to be understood that vehicle V could be a truck, automobile, recreational vehicle, etc.

Alert system 10 includes a housing, H, and in a preferred embodiment, housing H is generally a square box shape, although it is to be understood that housing H could be of a variety of other shapes, such as circular, triangular, octagonal, etc. (not shown).

Figure 2:
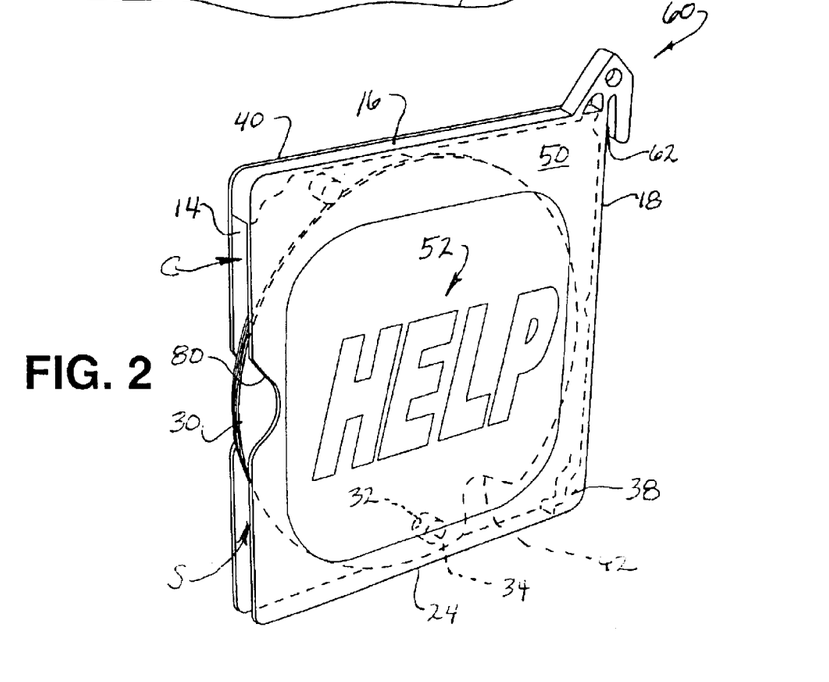
FIG. 2 is a perspective view of a vehicle alert system having sign members a carried within a housing.

As shown in FIG. 2, housing H includes an interior compartment, generally C, having a slot opening, generally S, extending through one side, 14 of housing H. Sides 16 and 18 of housing H are illustrated as being closed, with walls 20, 22, respectively, although it is to be understood that sides 16, 18 could also be open, if desired. Slot S extends along not only side 14 of housing H, but also along the bottom side, 24, of housing H. Carried inside of compartment C are a plurality of sign members, generally 30. Sign members 30 are shown in the drawings being generally circular in shape, although it is to be understood that sign members 30 could be of a variety of different shapes, such as triangular, square, octagonal, etc. (not shown).

Sign members 30 each include an opening 32 which receives a pivot post 34 found between walls 38 and 40 of housing H. This mounting of sign members 30 on pivot post 34 allows the sign members to pivot with respect to housing H through slot opening S on side 14 of housing H. Because slot S continues along side 14 and side 24 of housing H, sign members 30 are allowed to pivot more than 180° to a position where they hang below edge 24 of housing H, as shown in FIG. 1.

Sign members 30 are held within compartment C through a slight interference fit between the circumferential edges 41 of sign members 30 and a stop post 43. This prevents sign members 30 from inadvertently falling out of compartment C, since the resistance of the rubbing of edge 41 of a sign member 30 against stop 43 must first be deliberately overcome when the user selects and retracts a sign member from compartment C for use.

Vehicle alert device 10 can be constructed of molded plastic, or cardboard, metal, or some other suitable material. Sign members 30, if constructed of molded plastic, may include a recess portion 42 for minimizing the effect of unwanted excess plastic which may occur during the molding process.

Housing H includes planar face surfaces 50 on each of panels 38, 40 which provide locations for symbols or other indicia, generally 52, such as the word "HELP", or other similar messages, such as "EMERGENCY", "ASSISTANCE NEEDED", etc. Surfaces 50 also provide a place for the name of the manufacturer of device 10, and/or for the name of a company or advertiser, if devices 10 are to be used, for example, as promotional items.

Attached to the upper corner of housing H is an attachment device, or hook, generally 60, having a receiver 62 for receiving the upper edge 66 of window glass 68 of a window W. Although not shown, other types of attachment devices could be used instead of, or in connection with, hook 60, and could include suction cups for attachment to the window, clips, magnets placed on either side of the window, adhesives, etc FIG. 2 illustrates sign members 30 being contained within compartment C of housing H in a storage position. Alert system 10 would typically be in this configuration when it is in storage, perhaps in the glovebox, door pocket, console, etc. of the vehicle. Such configuration provides a compact system which lends itself to easy storage.

Figure 3:
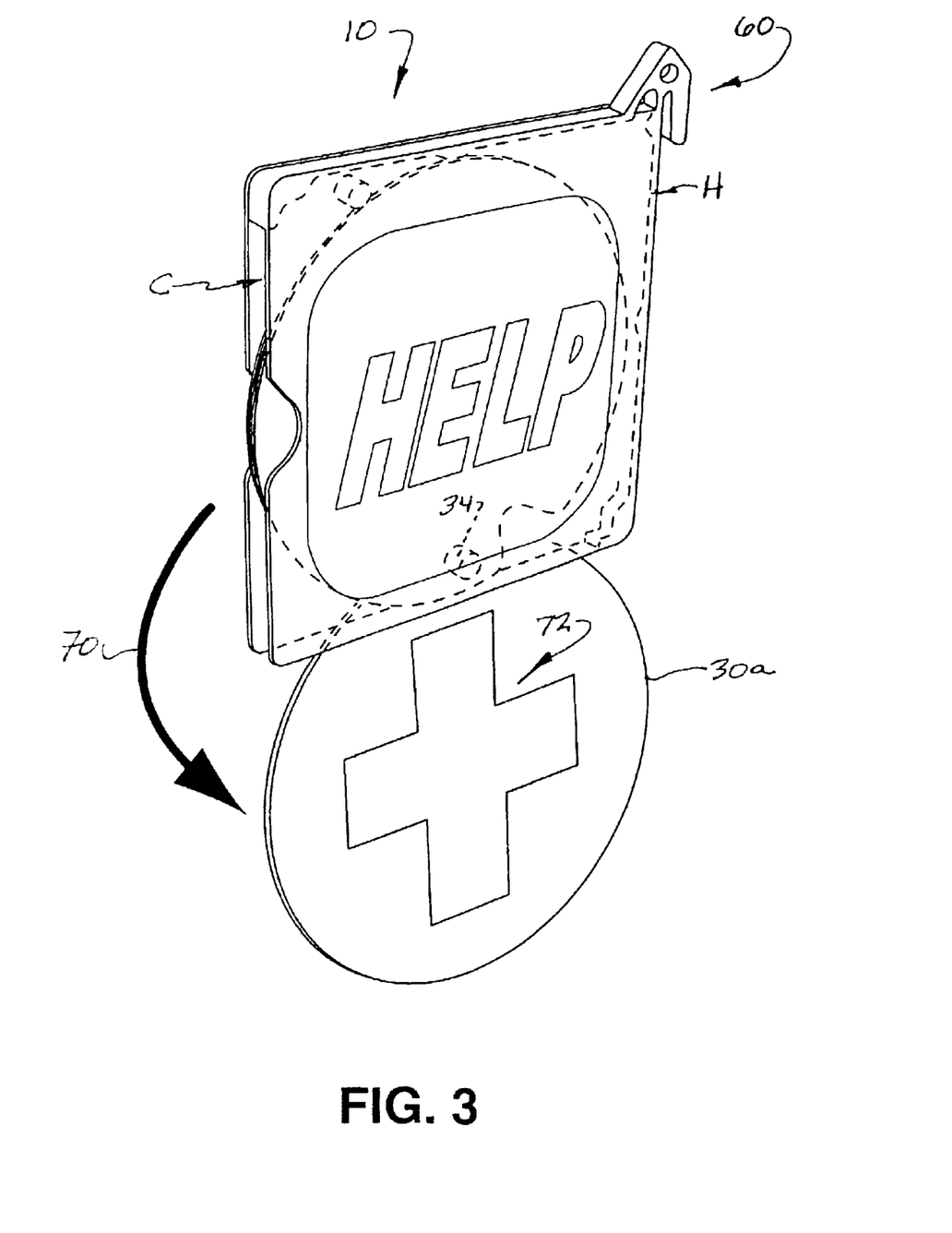
FIG. 3 is a vehicle alert system constructed in accordance with the present invention having a sign member pivoted outwardly from the housing and hanging downwardly therefrom.

FIG. 3 illustrates a sign member 30*a* having been moved from its storage position, in the direction of arrow 70, to an operational position, hanging from pivot post 34, beneath housing H. It is to be noted that sign member 30 would typically move through an arc of at least 180°, and preferably through an even larger arc, such that if housing H is at an angle once placed upon a window W, as shown in FIG. 1, the sign member 30*a* will still hang substantially vertically. In the FIG. 3 embodiment, sign member 30*a* bears the medical cross symbol 72, indicating that medical attention is required by the motorist.

Figure 4:
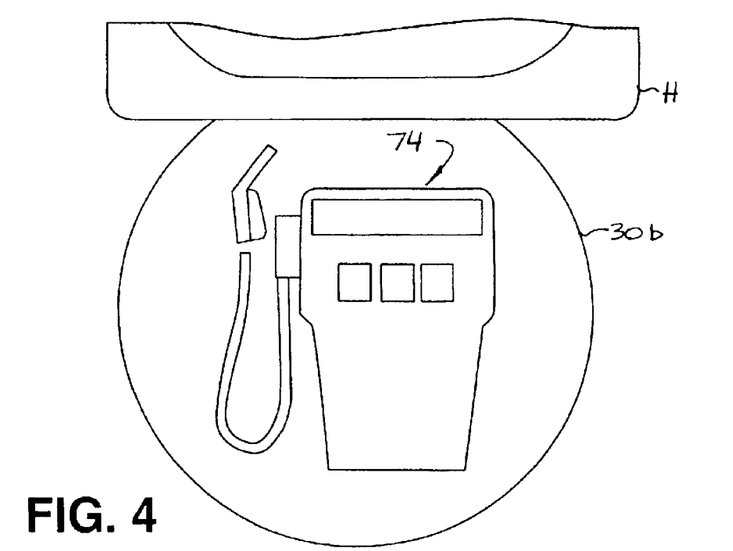
FIG. 4 is a side elevational view of a sign member with an icon indicating that fuel is needed by the stranded motorist.

FIG. 4 illustrates a sign member 30*b* bearing the symbol of a gasoline pump 74, indicating that the motorist in vehicle V requires fuel.

Figure 5:
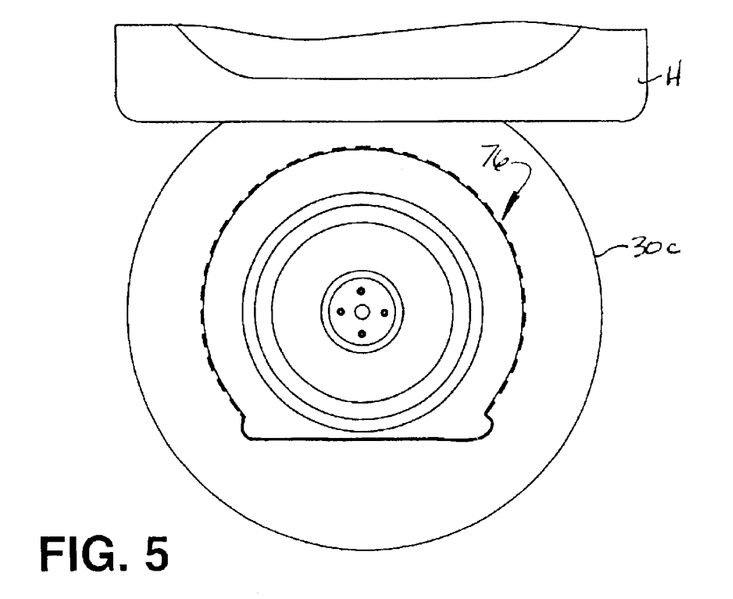
FIG. 5 is a side elevational view of a sign member having a flat tire icon indicating the need of tire repair by the stranded motorist.

FIG. 5 shows sign member 30*c* having the image of a flattened vehicle tire 76, indicating that the motorist requires tire repair services.

Figure 6:
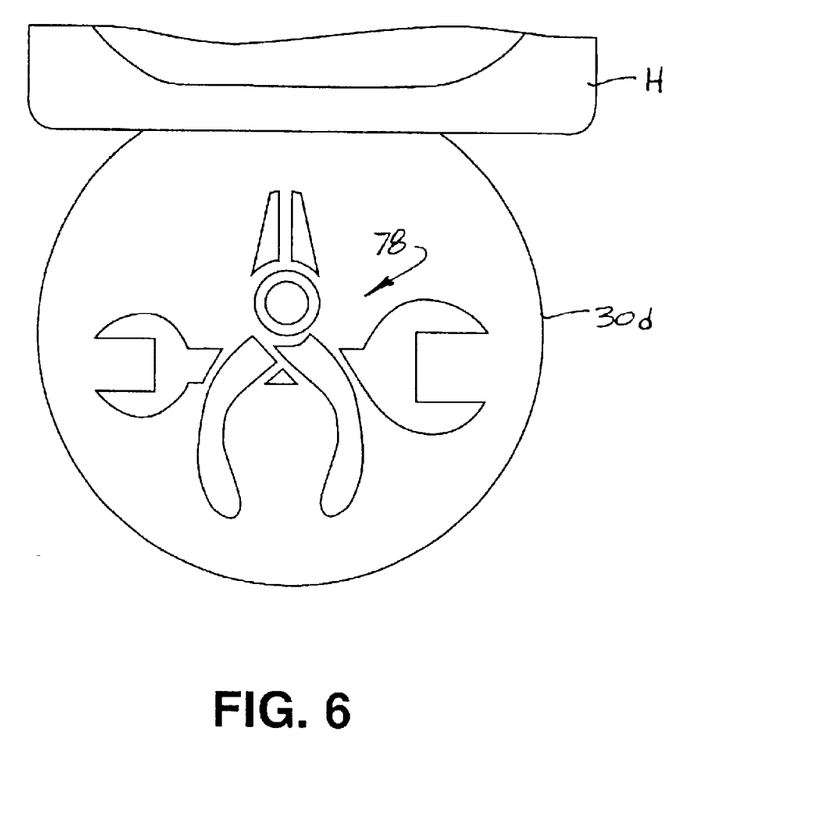
FIG. 6 is a side elevational view of a sign member having a mechanical repairs icon indicating that the stranded motorist has experienced a mechanical breakdown.

FIG. 6 illustrates sign member 30*d*, which bears the indicia of tools 78, thereby alerting passersby that the stranded motorist in vehicle V has experienced a mechanical breakdown and requires the assistance of a mechanic.

In operation, in the event of a mechanical breakdown, flat tire, medical emergency, or if the need for fuel arises, the operator of vehicle V simply removes vehicle alert system 10 from storage and selects the appropriate sign member 30*a*, 30*b*, 30*c*, or 30*d*. Through using his or her fingers, grasps such sign member through recesses 80 (FIG. 2) provided in edges 14 of housing H. The sign member is thus withdrawn from compartment C and pivoted about pivot post 34 such that the sign member hangs generally vertically beneath housing H. Then, using attachment member 60, receiver 62 thereof is placed along the upper edge 66 of window glass 68 on window W of vehicle V. This can be done without requiring the user to exit the vehicle. Once installed, housing H extends generally perpendicularly to the surface of window W to provide maximum visibility to passersby of the plight of vehicle V.

Figure 7:
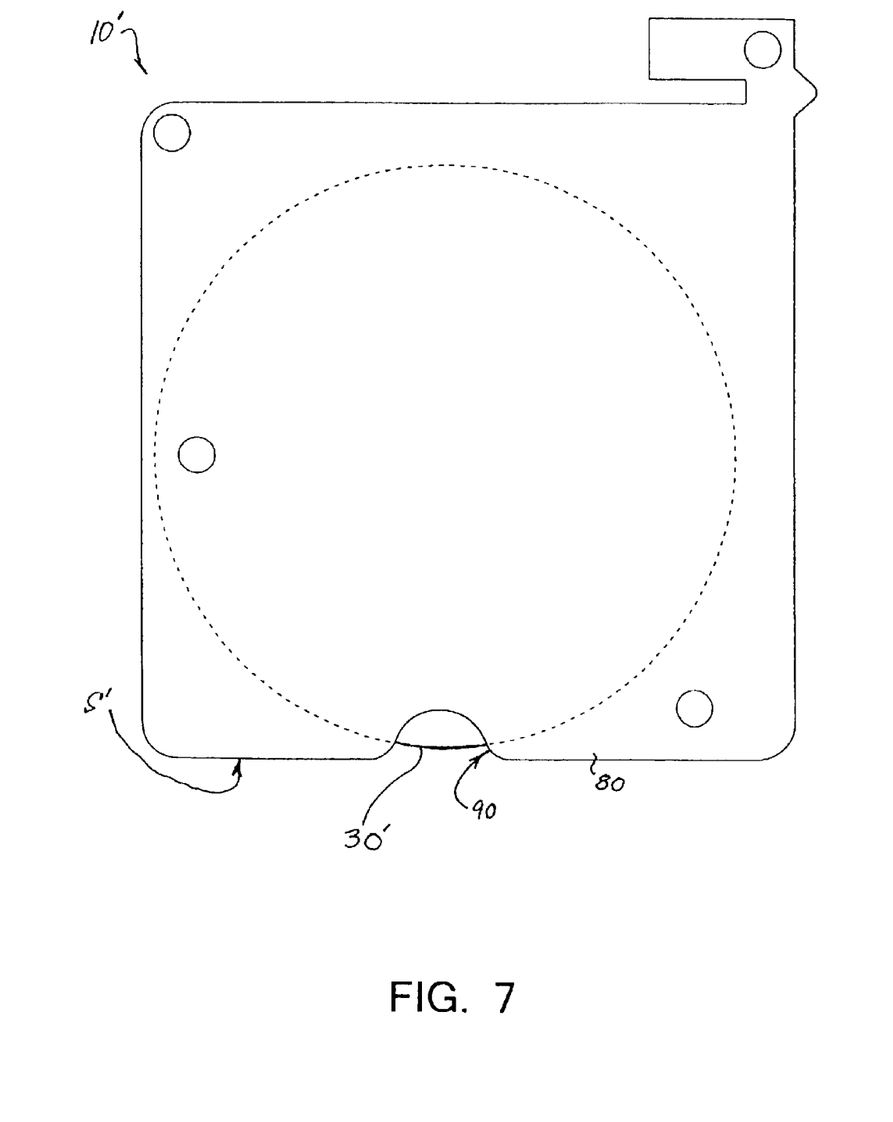
FIG. 7 is a side elevational view of an alternate embodiment of a vehicle alert system constructed in accordance with the present invention.
Figure 8:
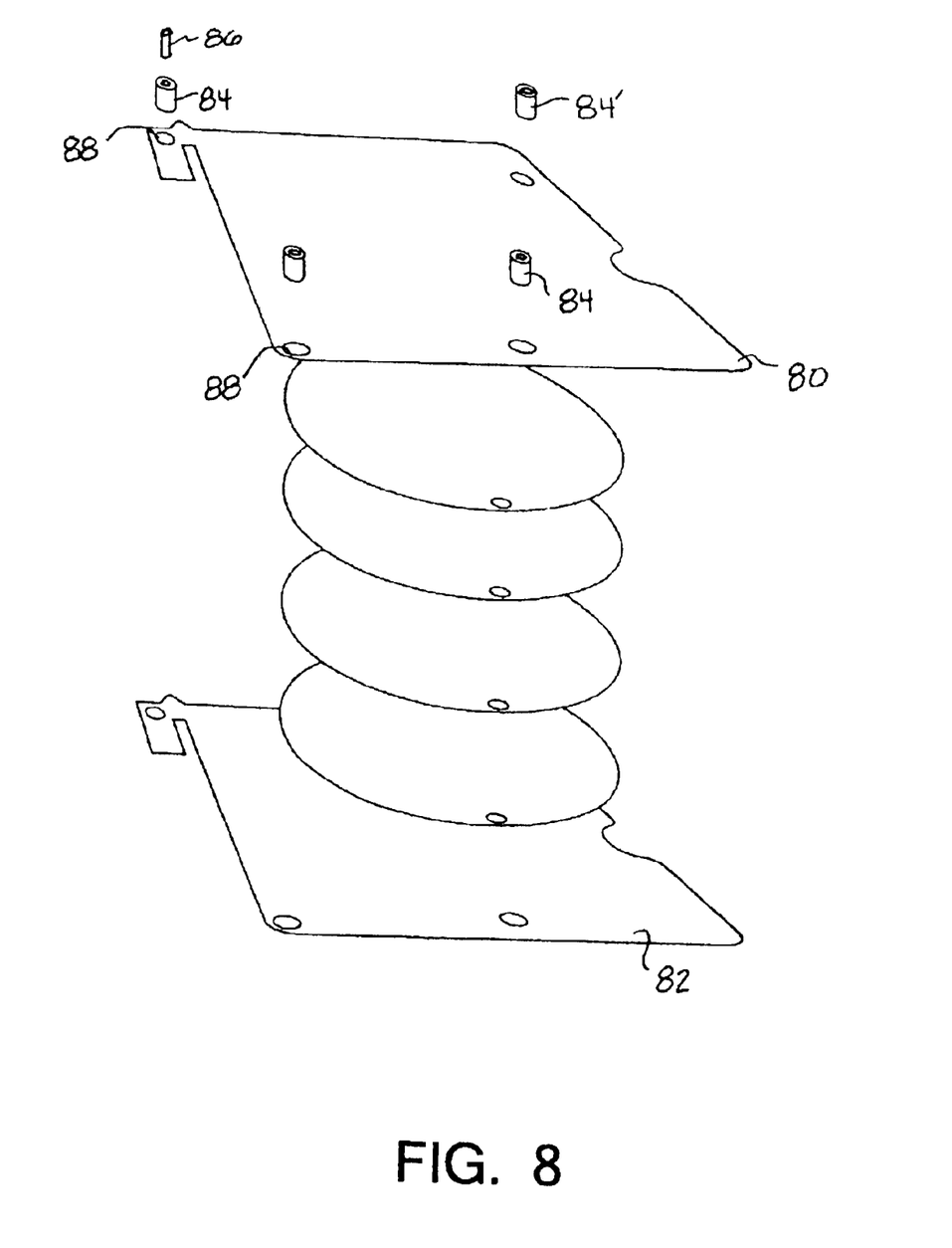
FIG. 8 is an exploded view of the alternate embodiment vehicle alert system illustrated in FIG. 7.

FIGS. 7 and 8 illustrate an alternate embodiment alert system, generally 10', constructed in accordance with the present invention. Alert system 10' includes side panels 80, 82 which are spaced apart from one another by spacers 84 through which grommets (only one shown) 86 pass. Grommets 86 extend through openings 88 in side panels 80, 82 and secure side panels 80, 82 to one another, forming a compartment, or receiver, generally 90, therebetween for receiving sign members 30' when sign members 30' are in a retracted position.

Spacer 84' adjacent opening S' preferably contacts sign members 30' as they are pulled outwardly through opening S'. Such contact may be overcome by the continued pulling of a particular sign member 30' in order to fully withdraw the sign member 30' and pivot it to its extended, signaling position. Spacer 84' thus acts as a stop to restrain sign members 30' from inadvertently coming out of compartment 90. This allows for only one sign member 30' to be selected at a time, if desired, and also reduces sign members 30' from falling, or "flopping out," of compartment 90 during storage or other periods of nonuse.

Figure 9:
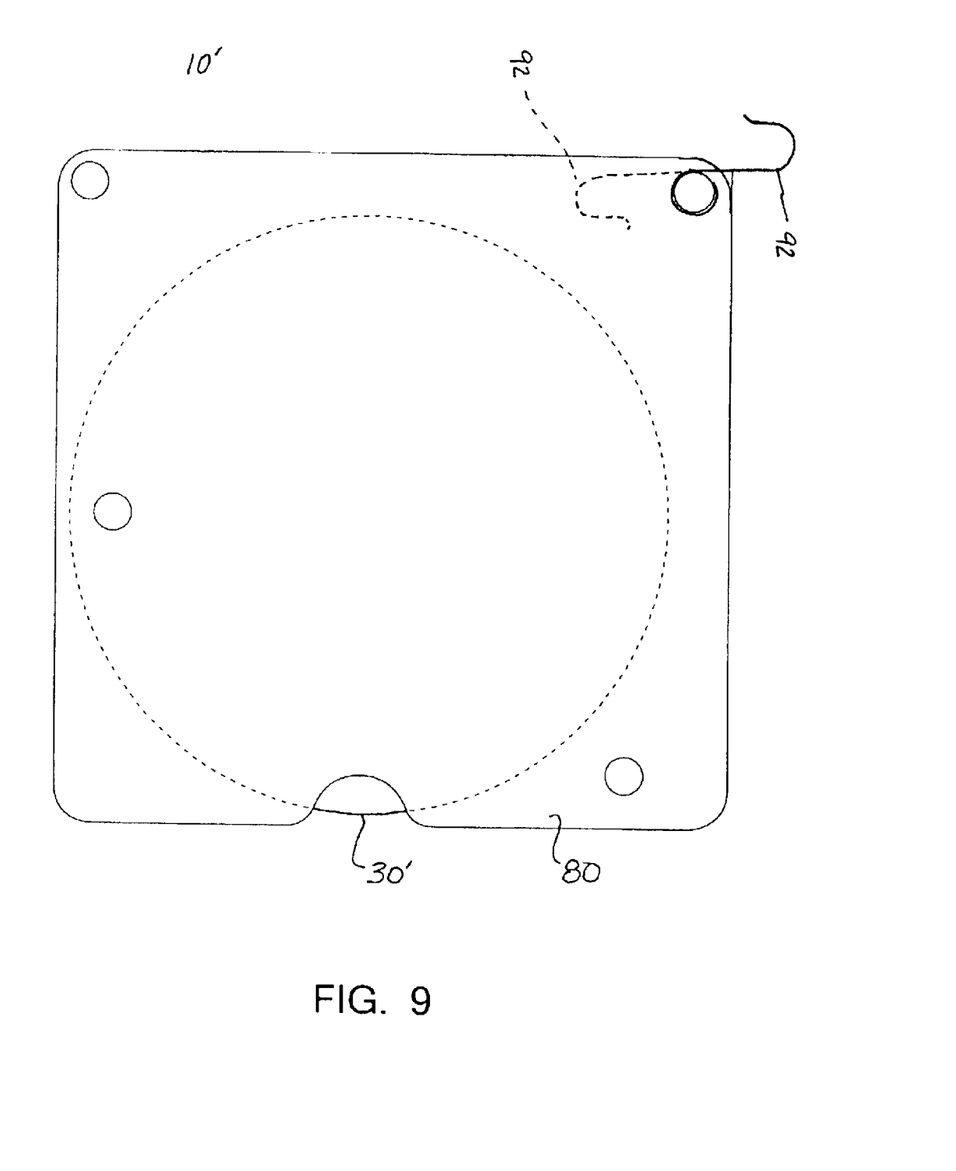
FIG. 9 is a side elevational view of another alternate embodiment of a vehicle alert system constructed in accordance with the present invention.

As shown in FIG. 9, a hook member, generally 92, could be provided on an alert system 10' instead of hook 60. Hook member 92 could be constructed of metal, plastic, wood, cardboard, or the like and is pivotally connected to side panels 80, 82 via a spacer 84. Hook member 92 can be pivoted between a retracted position in or adjacent to compartment 90, during periods of storage or nonuse of the system 10', and an extended position for use in hanging system 10' from the edge of a window or from some other support surface.

An advantage of hook member 92 is that because of its low profile, it can penetrate and extend into a conventional window track of a vehicle door window frame. This allows for system 10' to be attached to the window, and the window rolled up or raised to its uppermost position. By allowing the widow to be placed all the way up, inclement weather such as rain or snow can be kept from entering the window opening, and conditioned air from within the vehicle, such as heat or air conditioning can be maintained in the vehicle.

Side panels 80, 82 and sign members 30' could be made of a variety of materials, including plastic, metal, paper stock, cardboard, wood, or the like.

In one preferred embodiment, side panels 80, 82 are constructed from sheets of polystyrene, spacers 84 are constructed of polyvinylchloride (PVC) material, and grommets 86 are constructed of a suitable metal, such as aluminum or steel. t is to be understood, however, that the foregoing components of system 10' could be constructed of a variety of materials other than those discussed above, if desired.

From the foregoing, it can be seen that the present invention provides a vehicle alert system which is compact, which can be quickly put to use without the driver stepping out of the vehicle, and which provides a highly visible medium of transmitting emergency and other information concerning a vehicle or its occupants to other motorists.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the invention herein disclosed.

What is claimed is:

1. A signal device for attachment to the edge of a vehicle window, the signal device comprising:

a housing defining a receiver;

a hanger connected to said housing, said hanger being adapted for engaging with the edge of the vehicle window and for supporting said housing from the edge of the vehicle window;

at least one signal member adapted for pivoting from a retracted position substantially within said receiver through an arc of more than 180 degrees to an inverted position extending from said receiver for providing a signal; and a stop provided adjacent said receiver for restraining inadvertent pivoting of said signal member from said retracted position, said stop being configured such that said signal member engages said stop upon said signal member being pivoted from said retracted position to said inverted position.

2. The signal device as defined in claim 1, wherein said inverted position is substantially beneath said housing.

3. The signal device as defined in claim 1, wherein said hanger is pivotally connected to said housing for moving between a retracted position substantially within said housing and an extended position for hanging said housing from the edge of the vehicle window.

4. The signal device as defined in claim 1, wherein said housing includes a first panel and a second panel and spacer means for spacing said first panel and said second panel apart from one another to form said receiver.

5. The signal device as defined in claim 1, wherein said at least one signal member includes indicia thereon indicative of a specific need.

6. The signal device as defined in claim 1, wherein said housing and said at least one signal member are constructed of cardboard.

7. The signal device as defined in claim 1, wherein said housing and said at least one signal member are constructed of plastic.

8. The signal device as defined in claim 1, wherein said housing and said at least one signal member are constructed of metal.

9. The signal device as defined in claim 1, wherein said housing and said at least one signal member are constructed of paper stock.

10. The signal device as defined in claim 1, wherein said housing is elongated and said hanger is adapted for supporting said housing generally perpendicularly with respect to the window, and wherein said at least one signal member is adapted for extending generally parallel to said housing upon said at least one signal member being in said inverted position.

11. The signal device as defined in claim 1, wherein said at least one signal member is a generally circular disc.

12. A signal device for attachment to the edge of a vehicle window, the signal device comprising:

a housing defining a receiver;

a hanger connected to said housing, said hanger being adapted for engaging with the edge of the vehicle window and for supporting said housing from the edge of the vehicle window;

at least one signal member adapted for pivoting from a retracted position substantially within said receiver through an arc of more than 180 degrees to an inverted position extending from said receiver for providing a signal; and a stop provided adjacent said receiver for restraining inadvertent pivoting of said signal member from said retracted position towards said inverted position, said stop being configured such that said signal member engages said stop upon said signal member being pivoted from said retracted position to said inverted position.

13. A signal device for attachment to the edge of a vehicle window, the vehicle window being carried in a window frame, and the signal device comprising:

a housing defining a generally square-shaped receiver having four side walls;

a hanger connected to said housing, said hanger having a slot for receiving the edge of the vehicle window and a projection for receipt by the window frame of the vehicle window for supporting said housing from the edge of the vehicle window;

at least one generally circular signal disc pivotally attached to said housing for pivoting from a retracted position substantially within said receiver through an arc of more than 180 degrees to an inverted position extending from said receiver for providing a signal, wherein said inverted position is substantially beneath said housing;

a stop provided adjacent said receiver for restraining inadvertent pivoting of said signal disc from said retracted position, said stop being configured such that said signal disc engages said stop upon said signal disc being pivoted from said retracted position to said inverted position; and wherein the diameter of said at least one signal disc approximates the length of at least one of said four side walls of said receiver.

14. A signal device for attachment to the edge of a window, the signal device comprising:

a housing defining a receiver;

a hanger connected to said housing, said hanger being adapted for engaging with the edge of the window and for supporting said housing from the edge of the window;

at least one generally circular signal member adapted for moving from a retracted position substantially within said receiver through an arc of more than 180 degrees to become inverted in a signaling position extending from said receiver; and a stop provided adjacent said receiver for restraining inadvertent pivoting of said signal member from said retracted position, said stop being configured such that said signal member engages said stop upon said signal member being pivoted from said retracted position to said inverted position.

15. A signal device for attachment to the edge of a window, the signal device comprising:

a housing defining a receiver;

means for supporting said housing from the edge of the window;

at least one generally circular signal member adapted for moving from a retracted position substantially within said receiver through an arc of more than 180 degrees to become inverted in a signaling position extending from said receiver; and a stop provided adjacent said receiver for restraining inadvertent pivoting of said signal member from said retracted position, said stop being configured such that said signal member engages said stop upon said signal member being pivoted from said retracted position to said inverted position.

16. The signal device as defined in claim 15, wherein said means includes a hanger having a slot for receiving the edge of the vehicle window.

17. The signal device as defined in claim 15, wherein said means includes a hanger pivotally connected to said housing for moving between a retracted position substantially within said housing an extended position for supporting said housing from the edge of the vehicle window.

18. A signal device for attachment to the edge of a vehicle window, the signal device comprising:

a housing defining a receiver;

a hanger connected to said housing, said hanger being adapted for engaging with the edge of the window and for supporting said housing from the edge of the window;

a plurality of generally circular signal members pivotally connected to said housing and configured for pivoting between a retracted position substantially within said receiver through an arc of more than 180 degrees to an inverted signaling position extending from said receiver; and a stop provided adjacent said receiver for restraining inadvertent pivoting of said signal member from said retracted position, said stop being configured such that said signal member engages said atop upon said signal member being pivoted from said retracted position to said inverted position.

19. A method of signaling passersby from a vehicle, the vehicle having a window with an edge, the method comprising:

providing a housing defining a receiver, and a stop adjacent said receiver;

supporting said housing from the edge of the window;

providing at least one signal member connected to said housing and adapted for moving between a retracted position substantially within said receiver through an arc of more than 180 degrees an inverted signaling position extending from said receiver; and moving said signal member from said retracted position and into engagement with said stop, and then to said signaling position such that said signal member is inverted and exposed to the view of passersby.

* * * * *